(12) United States Patent

Kerr et al.

(10) Patent No.:     US 12,566,284 B2

(45) Date of Patent:        Mar. 3, 2026

(54) ACCESSORY FOR A NIGHT VISION INSTRUMENT

(71) Applicant: DS TACTICAL SUPPLY LTD., New Westminster (CA)

(72) Inventors: David Charles Kerr, New Westminster (CA); Alireza Moradian, Coquitlam (CA); Pavel Sergey Unger, Abbotsford (CA)

( * ) Notice:    Subject to any disclaimer, the term of this patent is extended or adjusted under 35 U.S.C. 154(b) by 456 days.

(21) Appl. No.: 18/123,904

(22) Filed:    Mar. 20, 2023

(65)            Prior Publication Data

US 2024/0319412 A1      Sep. 26, 2024

(51) Int. Cl.
*G02B 5/00*            (2006.01)
*G02B 7/02*            (2021.01)
(52) U.S. Cl.
CPC .............. *G02B 5/005* (2013.01); *G02B 7/02* (2013.01)
(58) Field of Classification Search
CPC ......... G02B 5/005; G02B 7/02; G02B 15/15; G02B 3/10; G02B 27/0081; G01J 5/04; G01J 5/028; H01J 40/14; G03B 9/06; G03B 9/10–24
USPC ....................................................... 359/227
See application file for complete search history.

(56)            References Cited

U.S. PATENT DOCUMENTS

| | | | |
|---|---|---|---|
| 4,505,564 | A | 3/1985 | Nishio et al. |
| 5,175,651 | A | 12/1992 | Marron et al. |
| 7,969,673 | B2 * | 6/2011 | Hanna .................... G02B 23/12 |
| | | | 359/410 |
| 10,359,257 | B2 | 7/2019 | Lowell |
| 11,448,482 | B1 | 9/2022 | Robb |
| 2017/0131514 | A1 * | 5/2017 | McCreight, Jr. ....... G02B 7/026 |
| 2020/0012087 | A1 | 1/2020 | Thomas et al. |

FOREIGN PATENT DOCUMENTS

| | | |
|---|---|---|
| CA | 3105641 A1 | 1/2020 |
| WO | 2007047769 A2 | 4/2007 |

\* cited by examiner

*Primary Examiner* — William R Alexander
*Assistant Examiner* — Alaina Marie Swanson

(57)            ABSTRACT

An accessory for a night vision instrument, a system comprising the accessory and the night vision instrument, and a method for mitigating overexposure of the night vision instrument to radiation are disclosed. A housing of the accessory holds a diaphragm, actuatably coupled to a dial, in front of an outermost lens of the night vision instrument. The housing and the dial are coupled to each other via a revolute joint to restrain their movement relative to each other along an aperture axis while allowing rotation of the dial to actuate the diaphragm. A ball detent extends between housing and dial surfaces extending around the aperture axis and axially over each other to cause engagement between. The ball detent is receivable in a groove by rotation of the dial to selectively actuate the diaphragm to a predetermined aperture.

20 Claims, 5 Drawing Sheets

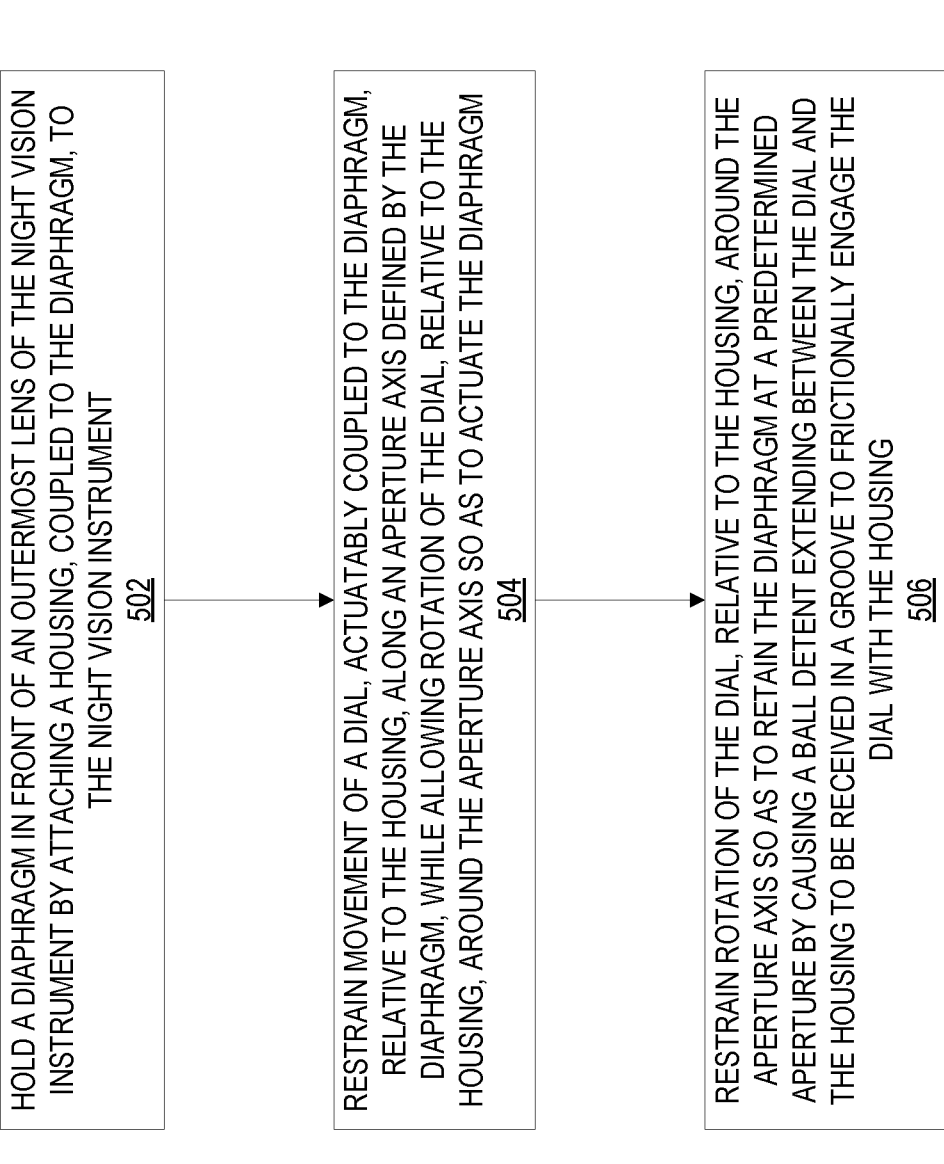

HOLD A DIAPHRAGM IN FRONT OF AN OUTERMOST LENS OF THE NIGHT VISION INSTRUMENT BY ATTACHING A HOUSING, COUPLED TO THE DIAPHRAGM, TO THE NIGHT VISION INSTRUMENT
502

RESTRAIN MOVEMENT OF A DIAL, ACTUATABLY COUPLED TO THE DIAPHRAGM, RELATIVE TO THE HOUSING, ALONG AN APERTURE AXIS DEFINED BY THE DIAPHRAGM, WHILE ALLOWING ROTATION OF THE DIAL, RELATIVE TO THE HOUSING, AROUND THE APERTURE AXIS SO AS TO ACTUATE THE DIAPHRAGM
504

RESTRAIN ROTATION OF THE DIAL, RELATIVE TO THE HOUSING, AROUND THE APERTURE AXIS SO AS TO RETAIN THE DIAPHRAGM AT A PREDETERMINED APERTURE BY CAUSING A BALL DETENT EXTENDING BETWEEN THE DIAL AND THE HOUSING TO BE RECEIVED IN A GROOVE TO FRICTIONALLY ENGAGE THE DIAL WITH THE HOUSING
506

FIG. 5

ACCESSORY FOR A NIGHT VISION INSTRUMENT

TECHNICAL FIELD

The disclosure relates generally to night vision instruments, and more particularly to devices for controlling the amount of electromagnetic radiation that sensors of night vision instruments are exposed to.

BACKGROUND

Focus caps are fittings attached to night vision instruments, such as night-vision (infrared) goggles and thermographic cameras, that have an aperture whose area may be selectively made smaller so as to improve focus of an object viewed using the night vision instrument. An example of a focus cap is provided in the reference U.S. Pat. No. 7,969, 673 B2. Such focus caps are used with night-vision goggles by law enforcement and military personnel. Such focus caps may be adjustable to a smaller aperture setting to achieve improved focus.

Exposure of integrated circuit sensors to excessive radiation can damage such sensors.

Focus caps allowing adjustments that are highly repeatable, rapid, and easily achieved are desired.

SUMMARY

In an aspect, the disclosure describes an accessory for a night vision instrument. The accessory also includes a diaphragm defining an aperture axis; a housing for holding the diaphragm in front of an outermost lens of the night vision instrument and defining a housing surface extending around the aperture axis; a dial actuatably coupled to the diaphragm and defining a dial surface extending around the aperture axis, the housing surface and dial surface axially extending over each other and defining a partially spherical groove, a revolute joint coupling the housing and the dial to each other to restrain axial movement, while allowing at least partial rotation around the aperture axis, of the dial relative to the housing to actuate the diaphragm; and a ball detent dimensioned to be received in the groove and extending between the housing surface and the dial surface to engage the housing surface with the dial surface such that the ball detent is receivable in the groove by rotation of the dial to selectively actuate the diaphragm to a predetermined aperture.

In an aspect, the disclosure describes a method of mitigating overexposure of a night vision instrument. The method of mitigating overexposure also includes holding a diaphragm in front of an outermost lens of the night vision instrument by attaching a housing, coupled to the diaphragm, to the night vision instrument; restraining movement of a dial, actuatably coupled to the diaphragm, relative to the housing, along an aperture axis defined by the diaphragm, while allowing rotation of the dial, relative to the housing, around the aperture axis so as to actuate the diaphragm; and restraining rotation of the dial, relative to the housing, around the aperture axis so as to retain the diaphragm at a predetermined aperture by causing a ball detent extending between the dial and the housing to be received in a groove to frictionally engage the dial with the housing.

In an aspect, the disclosure describes a system. The system also includes a night vision instrument defining an outermost lens; a diaphragm defining an aperture axis and disposed outside the night vision instrument; a housing for holding the diaphragm in front of the outermost lens and defining a housing surface extending around the aperture axis; a dial actuatably coupled to the diaphragm and defining a dial surface extending around the aperture axis, the housing surface and dial surface axially extending over each other and defining a partially spherical groove, a revolute joint coupling the housing and the dial to each other to restrain axial movement, while allowing at least partial rotation around the aperture axis, of the dial relative to the housing to actuate the diaphragm; and a ball detent dimensioned to be received in the groove and extending between the housing surface and the dial surface to engage the housing surface with the dial surface such that the ball detent is receivable in the groove by rotation of the dial to selectively actuate the diaphragm to a predetermined aperture.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 5 is a flow chart of an exemplary method of mitigating overexposure of a night vision instrument to radiation.

DETAILED DESCRIPTION

Figures 1A, 1B, 1C:
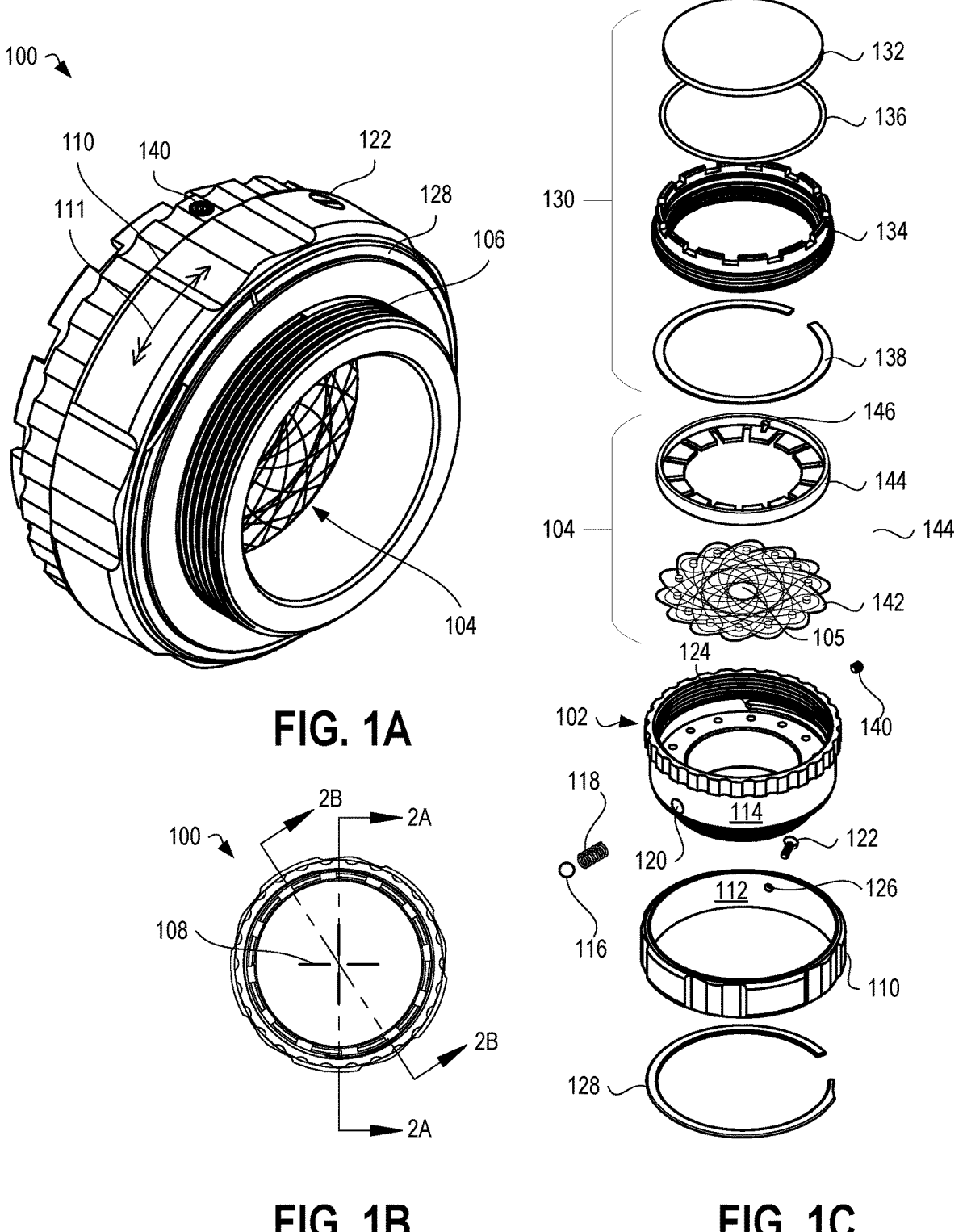
FIG. 1A is a rear perspective view of an accessory for a night vision instrument, in accordance with an embodiment.
FIG. 1B is a front elevation view of the accessory of FIG. 1A.
FIG. 1C is an exploded view of the accessory of FIG. 1A.

The following disclosure relates to accessories for night vision instruments for mitigating overexposure of such instruments to radiation (visible light and near-infrared radiation) and/or for improving focus of such instruments. Such instruments may be particularly vulnerable to overexposure. For example, it is common for a night vision instrument to have an image intensifier mechanism for allowing vision in low light conditions. Exposure of this image intensifier to excessive light can cause damage to the night vision instrument and/or obscure images generated by the night vision instrument.

An accessory according to embodiments disclosed herein may facilitate adjustment of radiation entering a night vision instrument to avoid oversaturation of, and damage to, sensors and/or the vision of personnel. This is particularly important during live fire and other critical operations. For example, explosions and passing through of spotlights in front of the night vision instrument can lead to overexposure and may require rapid, predictable adjustment of light entering the night vision instrument to prevent overexposure, especially since completely stopping entry of light into the night vision instrument may not always be a reasonable course of action during critical operations. In various embodiments, focus may be improved.

Compared to existing focus caps, embodiments of the accessory disclosed herein may be dust and/or water resistant, may be easier to mount, more secure when attached to the night vision instrument, allow adjustment of the aperture between three or more predetermined apertures, ensuring complete closure of aperture blades by application of spring force, and allow quickly toggling between aperture settings without depressing a button. Such advantages may be particularly important in live fire and other critical situations. Compared to a toggle mechanism relying on a locking pin instead of a spherule, greater ease of construction (manufacturability) may be achieved, e.g. there may be is no need for a ramp adjacent to the slot in the housing. Other advantages may be apparent upon review of this disclosure.

In some embodiments described herein, there is provided a lens-free device for improving the focus of a night vision instrument, comprising: a housing threadably engaged with a lens mount of the night vision instrument along an axis, a slot being formed in the housing to receive a spring and a spherule at least partially normal to the axis; an actuating ring disposed in the housing and rotatable relative to the housing about the axis via rotation of a dial that is coupled to the actuating ring and that at least partially surrounds the housing over the slot to retain the spring and the spherule in the slot; and a plurality of iris blades coupled to the actuating ring and the housing to define an aperture that is adjustable by rotation of the actuating ring via the dial; wherein a groove complementary to a spherical dome of the spherule is formed in the dial to engageably receive the spherule when the groove is rotated over the slot by rotation of the dial to provide resistance to rotation of the dial to retain the dial in-place at allow adjustment of the aperture to one or more predetermined aperture openings, and the groove is configured to disengage with the spherule when the groove is rotated away from the slot by rotation of the dial.

Aspects of various embodiments are described in relation to the figures.

FIG. 1A is a rear perspective view of an accessory 100 for a night vision instrument, in accordance with an embodiment.

FIG. 1B is a front elevation view of the accessory 100 of FIG. 1A.

FIG. 1C is an exploded view of the accessory 100 of FIG. 1A.

As shown in FIGS. 1A-1C, the accessory 100 includes a housing 102 for holding a diaphragm 104 in front of an outermost lens of the night vision instrument. The housing may be fastenable to an end of the night vision instrument. In various embodiments, the housing may be fastened to a terminal end of the night vision instrument defined by the outermost lens. As referred to herein, the outermost lens may be a lens attached to the night vision instrument. In some embodiments, the accessory may be threadably engaged with the terminal end. Advantageously, in some embodiments, threading 106 formed around a circumference of the housing adapted to the night vision instrument (a diameter of a terminal end thereof) may engage with threading on the night vision instrument intended for mounting lens accessories. A secure fitting of the accessory on to the night vision instrument may be achieved at low cost and complexity by such threadable engagement of the accessory 100 with the night vision instrument around the outermost lens thereof. Based on feedback received from law enforcement personnel, such features have been found to be particularly advantageous under situations where an operator of the night vision instrument is moving the instrument around, e.g. as during a fire fight or during manoeuvring and positioning. For example, it was found that other attachments were prone to falling off the night vision instrument.

The diaphragm 104 defines an aperture 105 or opening defined around an aperture axis 108. The aperture 105 is openable and closable around the aperture axis 108. In various embodiments, the diaphragm 104 may be operable so that the aperture 105 is openable to an open aperture and closable to a closed aperture. In various embodiments, the open aperture may form no obstruction to light (and/or radiation) entering the outermost lens when the accessory 100 is mounted on to the night vision instrument. In some embodiments, the closed aperture forms a substantially complete obstruction to light (and/or radiation) entering the outermost lens. For example, the closed aperture may be completely closed.

A dial 110 of the accessory 100 is coupled to the diaphragm 104 for actuation thereof by the dial 110. A user may be able to grip the dial 110 and cause rotation 111 around the aperture axis 108 to operate the diaphragm 104, e.g. to actuate the diaphragm from the open aperture to the closed aperture. As will be described later, the accessory 100 is configured such that the rotation 111 of the dial 110 in the accessory 100 causes rotation of the dial 110 relative to the housing 102 around the aperture axis 108 to actuate the diaphragm 104. In various embodiments, the accessory 100 may be advantageously configured to allow rapid, selective, precise, and intuitive actuation of the diaphragm 104 to cause a corresponding adjustment of the aperture to an open aperture, a closed aperture, and/or a predetermined aperture intermediate between the open and closed apertures. Such advantages may be particularly salient when the accessory 100 is deployed in highly demanding situations, e.g. deployment by law enforcement personnel in live fire situations. As referred to herein, "intermediate" between two extremes may refer to a point therebetween, which is not necessarily exactly midway.

As shown in FIGS. 1A-1C, in some embodiments, the housing 102 and the dial 110 define two co-axial annuli centred about the aperture axis 108. For example, the housing 102 and the dial 110 may each or both define a discrete symmetry or continuous symmetry (axisymmetric structures) around the aperture axis 108.

In the embodiment of FIGS. 1A-1C, the diaphragm 104 is shown to be an iris diaphragm wherein the dial 110 is actuatably coupled to the diaphragm 104 via a blade actuator 144, which in turn is engaged with a plurality of iris blades 142. The blade actuator 144 is engaged individually with each of the plurality of iris blades 142 via forwarding facing pins extending outwardly from front faces of the plurality of iris blades 142. The pins are slidable within complementary guides in the blade actuator 144. At the same time, the plurality of iris blades 142 may be held in-position relative to the housing 102 via rearward facing pins extending outwardly from rear faces, opposite to the front faces, of the plurality of iris blades 142 that are slotted into complementary receptacles (holes or slots) in the housing 102. The forward facing pins and the rearward facing pins are radially spaced apart from each other, relative to the aperture axis 108, so that rotation of the blade actuator 144 relative to the housing 102 causes the forward facing pins to slide along the guides while the rearward facing pins remain stationary relative to the housing 102. A rotational movement of the plurality of iris blades 142 that continuously varies the aperture size is achieved. It is understood that other diaphragms allowing substantially continuous adjustment may be utilized.

The diaphragm 104 may be coupled to the dial 110 to be actuated by dial 110. As shown in FIG. 1C, the blade actuator 144 comprises an aperture 146. This aperture 146 is configured to receive fastener to couple the blade actuator 144 to the dial 110.

The dial 110 defines a dial surface 112 and the housing 102 defines a housing surface 114. The dial surface 112 and the housing surface 114 extending over each other along the aperture axis 108. In addition to axial extension, the dial surface 112 and the housing surface 114 extend over each other around the aperture axis 108. The dial surface 112 may extend arcuately over the housing surface 114, i.e. positioned above the housing surface 114 in a radial direction normal to the aperture axis 108. In some embodiments, it is understood that the housing surface 114 may extend arcuately over the dial surface 112.

The accessory 100 may include a spherule 116 and a spring 118 configured to, together, be at least partially received in a slot 120 formed in the housing 102. The slot 120 may extend at least partially radially, normal to the aperture axis 108. It is found to be particularly advantageous for the slot 120 to extend substantially only normal to the aperture axis 108. The spherule 116 and the spring 118 may form part of a ball detent coupling the housing 102 to the dial 110 and, in particular, to retain rotation of one relative to another while allowing rapid, efficient adjustment of the aperture 105.

A member 122 extending between the housing 102 and the dial 110 serves to restrain axial movement of the housing 102 and the dial 110 relative to each other. The member 122 is received into a channel 124 of the housing 102 via an aperture 126 that is formed over the channel 124. The channel 124 extends around the aperture axis 108 and lateral thereto. The member 122 is slidably engaged with in the channel 124 to allow rotation of the dial relative to the housing while restraining movement along the aperture axis 108. For example, the channel 124 may be axially about as long as a dimension of the member 122 along the aperture axis 108 so as to restrain axial movement of the member 122, and hence of the housing 102 and the dial 110 relative to each other. In the embodiment of FIGS. 1A-1C, the member 122 is shown as a threaded fastener suitable for engaging with threads in the aperture 126. However, it is understood that the member 122 may take other forms in various embodiments. For example, the member 122 may be a radially extended member in unitary construction with either the housing 102 or the dial 110 so as to engage with the channel 124, which may be formed either in the dial 110 or the housing 102, respectively.

The member 122 may serve to couple the diaphragm 104, and its blade actuator 144 in particular, for common rotation with the dial 110. The member 122 may be engageably received in the aperture 146 to couple the blade actuator 144 to the dial 110 for common rotation. For example, the aperture 146 may be tapped to threadably engage with threading on the member 122. As such, rotation of the dial 110 may actuate the diaphragm 104.

A retainer 128 may be removably engaged with the housing 102 to prevent the dial 110 from disengaging with the housing 102. For example, such a retainer 128 may be disposed in position after the housing 102 and the dial 110 are engaged with one another. It is understood that, in some embodiments, the retainer 128 may be removably engaged with the dial 110 to prevent disengagement of the dial 110 from the housing 102. In various embodiments, the retainer 128 may be a retaining clip or partial ring. For example, the retainer 128 may be a partially circular resilient member defining two open ends spaced apart from each other to define a gap therebetween such that application of opposing forces on the two open ends causes the member to reversibly deform to an enlarged shape that can be (more) readily be positioned over the housing 102 adjacent to the dial 110 to abut and/or at least partially obstruct movement of the dial 110 away from the housing 102.

The accessory 100 may be provided with a shielding assembly 130 to protect the lens(es) of the night vision instrument and/or other components from dust and debris. Such protection may be particularly important during field missions in harsh environments. In some embodiments, the shielding assembly 130 may be disposed at a terminal end of the accessory 100. In some embodiments, the shielding assembly 130 may disposed distal from the outer lens of the night vision instrument. For example, the shielding assembly 130 may be disposed at a terminal end of the accessory 100 that is distal from the night vision instrument. Advantageously, this may simultaneously shield the night vision instrument as well as the diaphragm 104 from dust and debris.

The shielding assembly 130 comprises a spectrally-transparent plate 132 disposed in front of the diaphragm 104 to provide shielding without causing optical magnification, i.e. the plate 132 is not a lens, and while allowing the night vision instrument to receive radiation in a desired spectral range for night vision. For example, the plate 132 may be transparent to radiation in the visible spectrum and the near-infrared spectrum. As referred to here, spectrally-transparency may refer to transparency to radiation with a particular wavelength or within a desired wavelength range. In some embodiments, the plate 132 may configured to reduce optical distortion or interference so to allow shielding without affecting, or while mitigating, the quality of images generated through the night vision instrument.

The plate 132 may be sealingly engaged in a ring 134 (or annulus). In various embodiments, the plate 132 may be received in and frictionally engaged within a channel formed in an internal circumference of the ring 134. A sealing member 136 may be disposed in this channel between the plate 132 and the ring 134 so as to provide sealing and/or a frictional surface with which to engage the plate 132. For example, the channel may be dimensioned according to the sealing member 136 so as to seat or simply dispose the sealing member 136 therein. The sealing member 136 being deformable by the plate 132 being positioned into the channel so as to achieve a sealing fit. In various embodiments, the sealing member 136 may be an O-ring.

The ring 134 may be threadably engaged with the housing 102. A gasket 138 may be disposed between the ring 134 and the housing 102. The gasket 138 may be a circular gasket extending around the circumference of the ring 134 so as to simultaneously engage with the ring 134 and the housing 102 to provide a sealing surface against which the ring 134 may be tightened against to form a seal between the housing 102 and the ring 134.

A dog 140 may be received onto the ring 134 to prevent its disengagement from the housing 102. In various embodiments, the dog 140 may extend radially onto the ring 134, normal to an axis of rotation defined by the threadable engagement (the aperture axis 108, as shown in FIGS. 1A-1C). The dog 140 may forced radially onto the threads to frictionally prevent threadable disengagement. As shown in FIGS. 1A-1C, the dog 140 may be threaded fastener such as a set screw (a blind screw) that may be fastened radially onto the ring 134.

In various embodiments, the accessory 100 may be advantageously lens-free (with or without a shielding plate). In various embodiments, advantages may include increased robustness and reliability, as well as lower weight and greater mobility.

A system may be formed by coupling the accessory 100 with a night vision instrument.

Figures 2A, 2B:
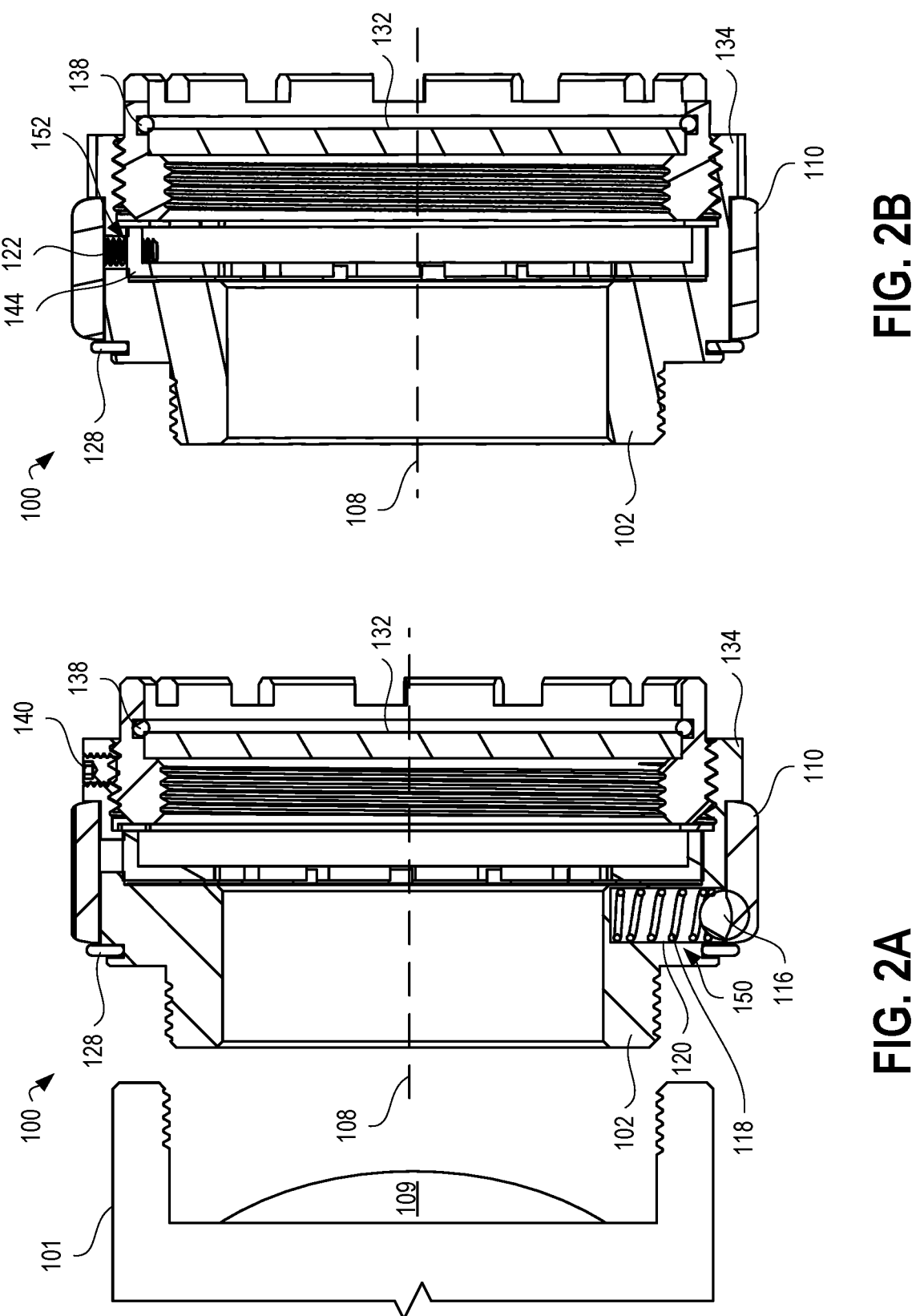
FIG. 2A is a cross-sectional view along the lines 2A-2A in FIG. 1B.
FIG. 2B is a cross-sectional view along a plane defined by the lines 2B-2B in FIG. 1B.

FIG. 2A is a cross-sectional view along the lines 2A-2A in FIG. 1B.

A notional partial view of the night vision instrument 101, showing threads thereon and an outermost lens 109, is included in FIG. 2A. A system may be formed by coupling the accessory 100 with the night vision instrument 101.

FIG. 2B is a cross-sectional view along a plane defined by the lines 2B-2B in FIG. 1B.

Referring to FIGS. 2A-2B, the spring 118 and spherule 116 are received in the slot 120 to form a ball detent 150 extending between the housing surface 114 and the dial surface 112 to cause engagement therebetween. In particular, the spring 118 is disposed in the slot 120 so as to extend radially from the housing surface 114 to engage with the dial surface 112 via the spherule 116. The spherule 116 is disposed between the spring 118 and the dial surface 112 so as to be pushed against the dial surface 112.

The housing surface 114 and the dial surface 112 define a partially spherical groove, e.g. a hemispherical, or otherwise dome-shaped (or cap-shaped) groove. In the embodiment of FIGS. 2A-2B, such a groove is formed in the dial surface 112. The ball detent 150, i.e. a spherule 116 or other ball thereof, is dimensioned to be received in the groove to engage the housing surface with the dial surface such that selective actuation of the diaphragm 104 to a predetermined aperture. In various embodiments, the predetermined aperture may allow more electromagnetic radiation into night vision instrument 101 (via the outermost lens 109 thereof) than would be allowed by a closed aperture but less such radiation than would be allowed by an open aperture. In various embodiments, the predetermined aperture may be configured to improve focus.

As shown in FIGS. 2A-2B, the member 122 is engaged with the channel 124 to form a revolute joint 152 that couples the dial 110 to the housing 102 for relative rotation around the aperture axis 108 while restraining relative axial movement. In the embodiment of FIGS. 2A-2B, the channel 124 forms an opening allowing the member 122 to pass through as to allow the member 122 to engage with the blade actuator 144 via the channel 124 so as to allow actuation of the diaphragm 104 by rotation of the dial 110. In such an embodiment, it is understood that the aperture 126 may be dimensionally adapted to the member 122 so as to effect an efficient, low-slip (or no-slip) rotation of the blade actuator 144 by the dial 110 so as to achieve actuation of the diaphragm 104.

Figure 3A:
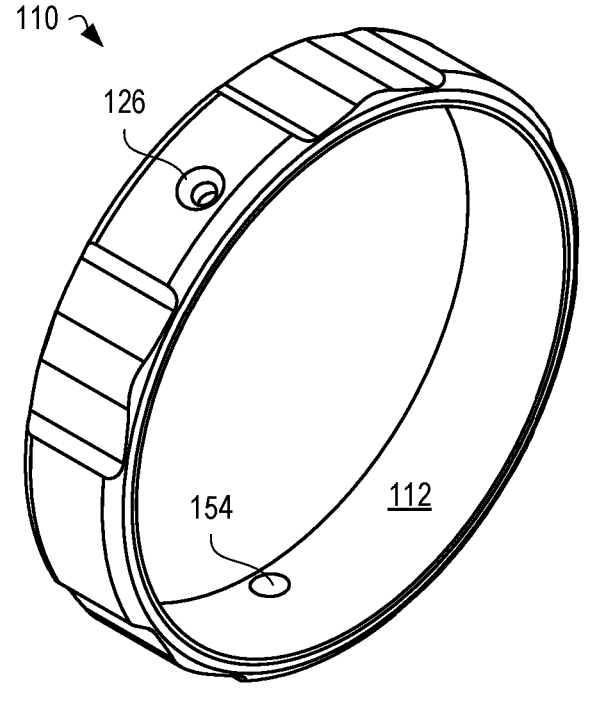
FIG. 3A is a perspective view of a dial of the accessory, in accordance with an embodiment.

FIG. 3A is a perspective view of a dial of the accessory, in accordance with an embodiment.

Figure 3B:
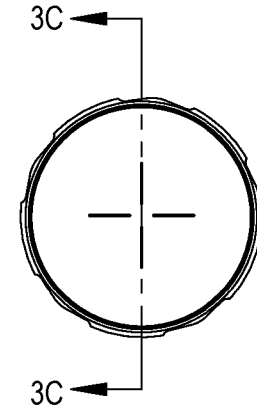
FIG. 3B is a front elevation view of dial of FIG. 3A.

FIG. 3B is a front elevation view of dial of FIG. 3A.

Figure 3C:
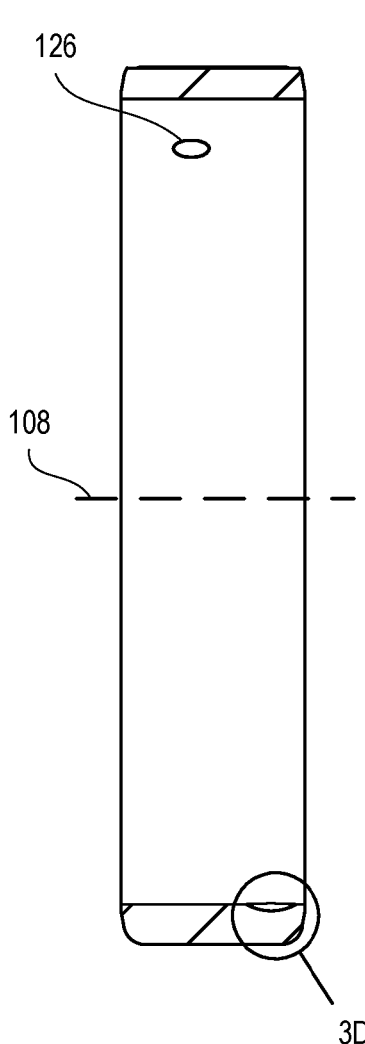
FIG. 3C is a cross-sectional view along a plane defined by the lines 3C-3C in FIG. 3B.

FIG. 3C is a cross-sectional view along a plane defined by the lines 3C-3C in FIG. 3B.

Figure 3D:
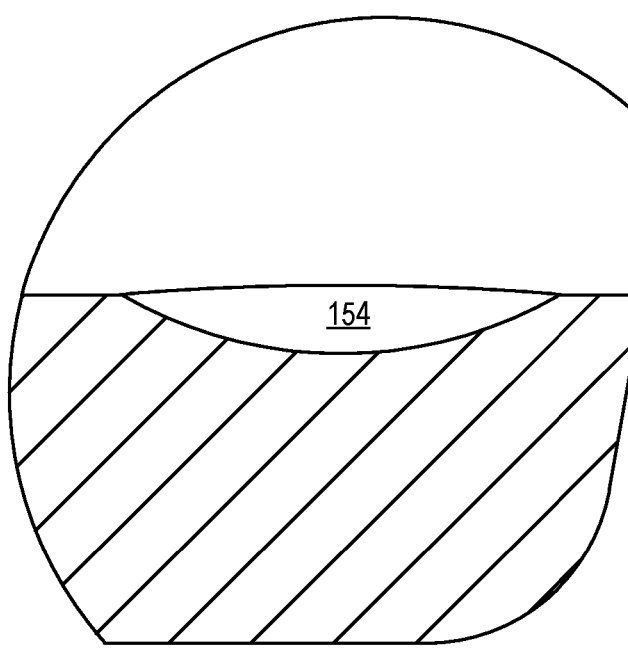
FIG. 3D is an enlarged view of region 3D in FIG. 3C.

FIG. 3D is an enlarged view of region 3D in FIG. 3C.

As shown in FIGS. 3A-3C, the groove 154 is partially spherical and formed in the dial surface 112, e.g. domed or cap-shaped so as to receive the spherule 116.

Figures 4A, 4B, 4C:
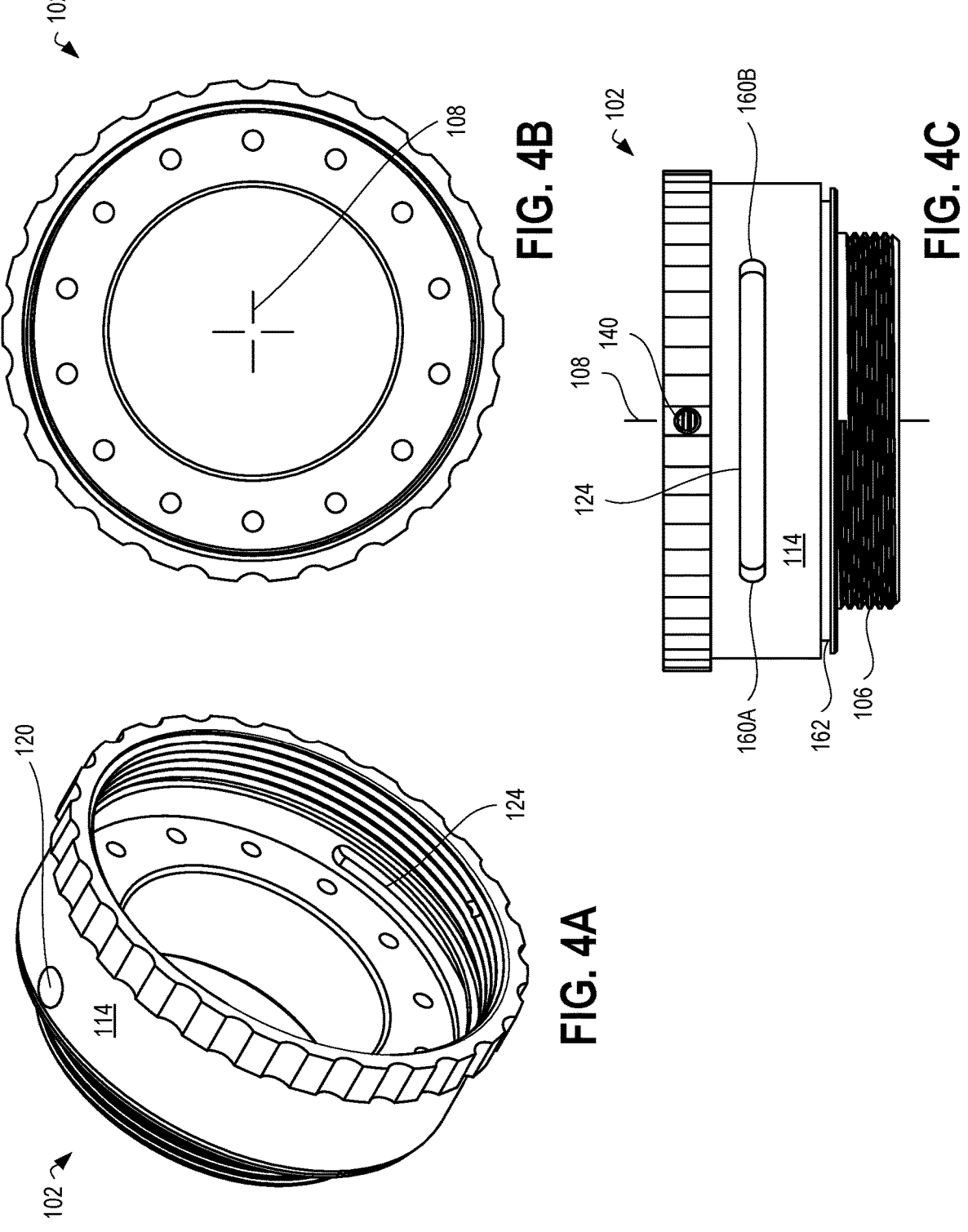
FIG. 4A is a front perspective view of a housing, in accordance with an embodiment.
FIG. 4B is a front elevation view of the housing of FIG. 4A.
FIG. 4C is a side elevation view of the housing of FIG. 4A.

FIG. 4A is a front perspective view of a housing, in accordance with an embodiment.

FIG. 4B is a front elevation view of the housing of FIG. 4A.

FIG. 4C is a side elevation view of the housing of FIG. 4A.

As shown in FIG. 4C, the channel 124 may be arcuate and may extend between two opposite terminal ends 160A, 160B so as to allow partial rotation of the member 122 around the aperture axis 108 to allow adjustment of the aperture 105 between two extremes. For example, the diaphragm 104 may be configured to form an open aperture when the member 122 is positioned at the first terminal end 160A and to form a closed aperture when the member 122 is positioned at the second terminal end 160B. When the member 122 is positioned in-between the two opposite terminal ends 160A, 160B, the aperture 105 may be slightly open/closed. The predetermined aperture may be one such preferred aperture that may be rapidly accessible by means of the ball detent. FIG. 4C also shows the pocket 162 that receives the retainer 128.

An operator may achieve operation of the accessory 100 by threadably engaging the accessory 100 with the night vision instrument 101 to form the system. Once so attached, the operator may rotate the dial 110 to achieve a fully open aperture. Actuating the diaphragm 104 to the fully open position may be achieved readily by rotating the dial 110 to an extreme end, wherein the member 122 is at the terminal end 160A. To improve focus or reduce oversaturation of a sensor of the night vision instrument, e.g. in response to environmental and/or operational considerations, the operator may further rotate dial 110 until the ball detent 150 engages with groove 154. This may occur readily since the spherule 116 will retainably slide into the groove 154 and may therefore contribute to usability of the device and allow the operator to achieve quick adjustment to mitigate sensor damage. To further protect the sensor, e.g. in response to a high radiation event, the operator may readily actuate the diaphragm 104 to close the aperture 105 by rotating the dial 110 to another extreme end, wherein the member 122 is at the terminal end 160B. This may be achieved without a great amount of effort as the spherule 116 is found to readily dislodge from the groove 154 upon application of a predetermined torque to the dial 110. In various embodiments, the desired torque for operation may be predetermined by selection of the depth of the groove 154. The desired torque may be chosen according to a desired application or based on a predicted operating environment. For example, the greater the spherical section represented by the groove 154 depression, the more torque may be required to dislodge the spherule 116 from the groove 154.

FIG. 5 is a flow chart of an exemplary method 500 of mitigating overexposure of a night vision instrument to radiation.

Step 502 of the method 500 includes holding a diaphragm in front of an outermost lens of the night vision instrument by attaching a housing, coupled to the diaphragm, to the night vision instrument.

Step 504 of the method 500 includes restraining movement of a dial, actuatably coupled to the diaphragm, relative to the housing, along an aperture axis defined by the diaphragm, while allowing rotation of the dial, relative to the housing, around the aperture axis so as to actuate the diaphragm.

Step 506 of the method 500 includes restraining rotation of the dial, relative to the housing, around the aperture axis so as to retain the diaphragm at a predetermined aperture by causing a ball detent extending between the dial and the housing to be received in a groove to frictionally engage the dial with the housing.

In some embodiments of the method 500, restraining movement of the dial along the aperture axis while allowing rotation of the dial around the aperture axis includes slidably engaging a protrusion extending between the dial and housing in an arcuate channel extending lateral to, and around, the aperture axis.

Some embodiments of the method 500 include shielding the diaphragm, without causing optical magnification while allowing the night vision instrument to receive radiation for night vision, by a spectrally-transparent plate disposed in front of the diaphragm.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, additional grooves may be provided in the dial surfaces to achieve a greater number of predetermined aperture settings, or a groove for receiving the ball detent may be formed in the housing surface instead of the dial surface. Yet further modifications could be implemented by a person of ordinary skill in the art in view of the present disclosure, which modifications would be within the scope of the present technology.

What is claimed is:

1. An accessory for a night vision instrument, comprising:
a diaphragm defining an aperture axis;
a housing holding the diaphragm in front of an outermost lens of the night vision instrument and defining a housing surface extending around the aperture axis;
a dial actuatably coupled to the diaphragm and defining a dial surface extending around the aperture axis, the housing surface and dial surface axially extending over each other and defining a partially spherical groove, a revolute joint coupling the housing and the dial to each other to restrain axial movement, while allowing at least partial rotation around the aperture axis, of the dial relative to the housing to actuate the diaphragm; and
a ball detent dimensioned to be received in the groove and extending between the housing surface and the dial surface to engage the housing surface with the dial surface such that the ball detent is receivable in the groove by rotation of the dial to selectively actuate the diaphragm to a predetermined aperture so as to mitigate overexposure of the night vision instrument via the outermost lens.

2. The accessory of claim 1, wherein the groove is formed in the dial surface, extending arcuately over the housing surface, and a spring of the ball detent is disposed in a slot in the housing surface so as to extend radially from the housing surface to engage with the dial surface via a spherule of the ball detent disposed between the spring and the dial surface.

3. The accessory of claim 2, wherein the dial and the housing define two co-axial annuli centred about the aperture axis and engaged with each other via the ball detent.

4. The accessory of claim 1, wherein the revolute joint comprises a member slidably engaged in an arcuate channel extending lateral to, and around, the aperture axis.

5. The accessory of claim 4, wherein the predetermined aperture is intermediate between an open aperture and a closed aperture, the diaphragm forming the open aperture when the member is positioned at a first terminal end of the arcuate channel, and forming the closed aperture when the member is positioned at a second terminal end of the arcuate channel.

6. The accessory of claim 1, wherein the housing defines threading for threadably engaging with the night vision instrument around the outermost lens of the night vision instrument.

7. The accessory of claim 1, further comprising: a spectrally-transparent plate disposed in front of the diaphragm to shield the diaphragm without causing optical magnification while allowing the night vision instrument to receive radiation for night vision.

8. The accessory of claim 7, wherein the plate is sealingly engaged in a ring threadably engaged with the housing.

9. The accessory of claim 1, wherein the accessory is lens-free.

10. A method of mitigating overexposure of a night vision instrument, comprising:
holding a diaphragm in front of an outermost lens of the night vision instrument by attaching a housing, coupled to the diaphragm, to the night vision instrument;
restraining movement of a dial, actuatably coupled to the diaphragm, relative to the housing, along an aperture axis defined by the diaphragm, while allowing rotation of the dial, relative to the housing, around the aperture axis so as to actuate the diaphragm; and
restraining rotation of the dial, relative to the housing, around the aperture axis so as to retain the diaphragm at a predetermined aperture by causing a ball detent extending between the dial and the housing to be received in a groove to frictionally engage the dial with the housing so as to mitigate overexposure of the night vision instrument via the outermost lens.

11. The method of claim 10, wherein restraining movement of the dial along the aperture axis while allowing rotation of the dial around the aperture axis includes slidably engaging a member extending between the dial and housing in an arcuate channel extending lateral to, and around, the aperture axis.

12. The method of claim 10, further comprising:
shielding the diaphragm, without causing optical magnification while allowing the night vision instrument to receive radiation for night vision, by a spectrally-transparent plate disposed in front of the diaphragm.

13. A system, comprising:
a night vision instrument defining an outermost lens;
a diaphragm defining an aperture axis and disposed outside the night vision instrument;
a housing holding the diaphragm in front of the outermost lens and defining a housing surface extending around the aperture axis;
a dial actuatably coupled to the diaphragm and defining a dial surface extending around the aperture axis, the housing surface and dial surface axially extending over each other and defining a partially spherical groove, a revolute joint coupling the housing and the dial to each other to restrain axial movement, while allowing at least partial rotation around the aperture axis, of the dial relative to the housing to actuate the diaphragm; and
a ball detent dimensioned to be received in the groove and extending between the housing surface and the dial surface to engage the housing surface with the dial surface such that the ball detent is receivable in the groove by rotation of the dial to selectively actuate the diaphragm to a predetermined aperture so as to mitigate overexposure of the night vision instrument via the outermost lens.

14. The system of claim 13, wherein the groove is formed in the dial surface, the dial surface extends arcuately over the housing surface, and a spring of the ball detent is disposed in a slot in the housing surface so as to extend radially from the housing surface to engage with the dial surface via a spherule of the ball detent disposed between the spring and the dial surface.

15. The system of claim 14, wherein the dial and the housing define two co-axial annuli centred about the aperture axis and engaged with each other via the ball detent.

16. The system of claim 13, wherein the revolute joint comprises a member slidably engaged in an arcuate channel extending lateral to, and around, the aperture axis.

17. The system of claim 16, wherein the predetermined aperture is intermediate between an open aperture and a closed aperture, the diaphragm forming the open aperture when the member is positioned at a first terminal end of the arcuate channel, and forming the closed aperture when the member is positioned at a second terminal end of the arcuate channel.

18. The system of claim 13, wherein the housing defines threading for threadably engaging with the night vision instrument around the outermost lens of the night vision instrument.

19. The system of claim 13, further comprising:

a spectrally-transparent plate disposed in front of the diaphragm to shield the diaphragm without causing optical magnification while allowing the night vision instrument to receive radiation for night vision.

20. The system of claim 19, wherein the plate is sealingly engaged in a ring threadably engaged with the housing.

*  *  *  *  *